(12) United States Patent
Kumar et al.

(10) Patent No.: US 8,949,148 B2
(45) Date of Patent: Feb. 3, 2015

(54) GOODS RECEIPT PREPARATION

(75) Inventors: Amar Kumar, Düren (DE); Wolfgang E. Walter, Hambruecken (DE); Viola Mitterer, Waldsee (DE); Pascale van Laethem, Ketsch (DE)

(73) Assignee: SAP AG, Walldorf (DE)

( * ) Notice: Subject to any disclaimer, the term of this patent is extended or adjusted under 35 U.S.C. 154(b) by 2034 days.

(21) Appl. No.: 11/849,148

(22) Filed: Aug. 31, 2007

(65) Prior Publication Data

US 2009/0063233 A1    Mar. 5, 2009

(51) Int. Cl.
*G06Q 10/00* (2012.01)
*G06Q 10/06* (2012.01)
*G06Q 10/08* (2012.01)

(52) U.S. Cl.
CPC .............. *G06Q 10/06* (2013.01); *G06Q 10/083* (2013.01); *G06Q 10/087* (2013.01)
USPC ........................................................... 705/28

(58) Field of Classification Search
None
See application file for complete search history.

(56) References Cited

U.S. PATENT DOCUMENTS

| | | | |
|---|---|---|---|
| 2002/0019759 A1* | 2/2002 | Arunapuram et al. | 705/7 |
| 2005/0119786 A1* | 6/2005 | Kadaba | 700/224 |
| 2007/0038673 A1* | 2/2007 | Broussard et al. | 707/104.1 |

* cited by examiner

*Primary Examiner* — Paul Danneman
(74) *Attorney, Agent, or Firm* — Blakely Sokoloff Taylor & Zafman LLP

(57) ABSTRACT

Methods and systems for receiving shipping documents, correlating information in the shipping documents with purchase-order information in a database to produce expected delivery manifests, then directing a transport to a processing facility to unload items which are verified against the delivery manifest. Software to support these systems is also described and claimed.

18 Claims, 4 Drawing Sheets

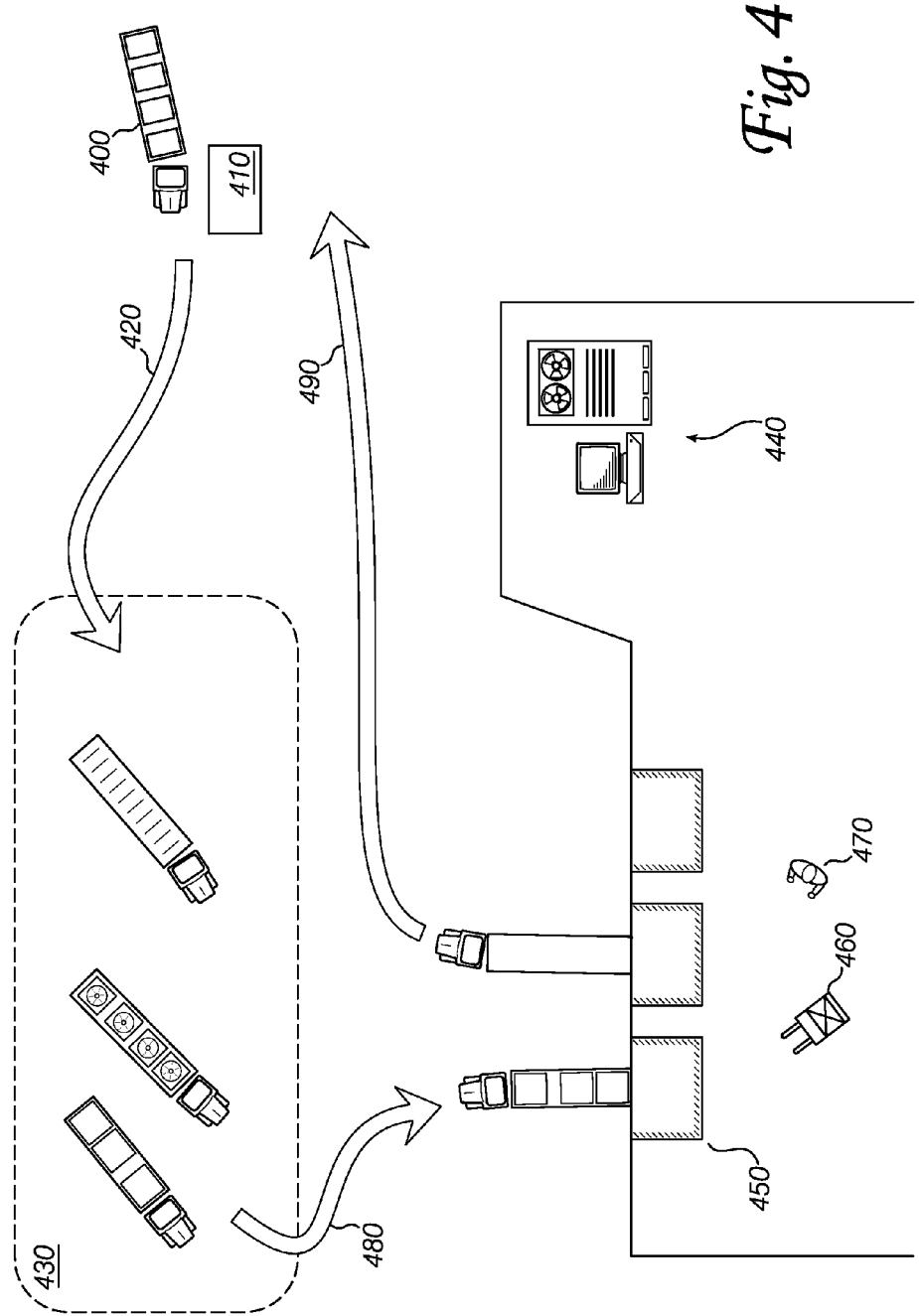

GOODS RECEIPT PREPARATION

FIELD

The invention relates to transport and provisioning logistics. More specifically, the invention relates to methods for streamlining the correlation of real-world goods deliveries with electronic data processing records representing the deliveries.

BACKGROUND

A supply chain or supply network is a set of cooperating entities that, together, accomplish some or all of the work of producing a product or service and delivering it to a consumer. Some goods require little processing between production and sale, but many others are made up of hundreds or thousands of components, each of which in turn may be the end product of another supply chain involving more producers and processors. Since each stage in a supply chain or network contributes to the cost of the final product, it is important for stages to operate efficiently, so that the costs of producing the product permit it to be priced competitively with similar alternatives. Inefficiencies at any stage may result in lost business for the inefficient entity, or even in the demise of the product or service.

Although different supply chain stages may perform wildly different functions, one common activity that occurs at most stages is the receipt of materials from a previous stage. (Even original supply chain stages that produce raw materials to feed a chain usually receive supplies or other materials for use in the stage.) The apparently-simple act of accepting a delivery has wide-ranging implications on enterprise operations. For example, accepting goods may create or affect contractual or legal obligations between the shipper and receiver. The goods may be a rate-limiting input to a process occurring at the stage, so new activity may have to be scheduled. Indeed, if the goods are perishable, their arrival may require stage activity to start quickly.

Procedures to streamline the "receiving" activities in an organization can reduce the time spent and the costs incurred in this common, but important, processing step.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 4 shows a receiving facility that implements an embodiment of the invention.

DETAILED DESCRIPTION

Goods receipt (for example, in a warehouse) is a complex function that involves process optimization and multiple checks on the arriving goods. The complexity increases further when an incoming shipment lacks an Advanced Shipping Notification ("ASN"). Embodiments of the invention break the process into several sub-processes, which may be interleaved between different shipments to reduce contention for rate-limiting resources.

Figure 1:
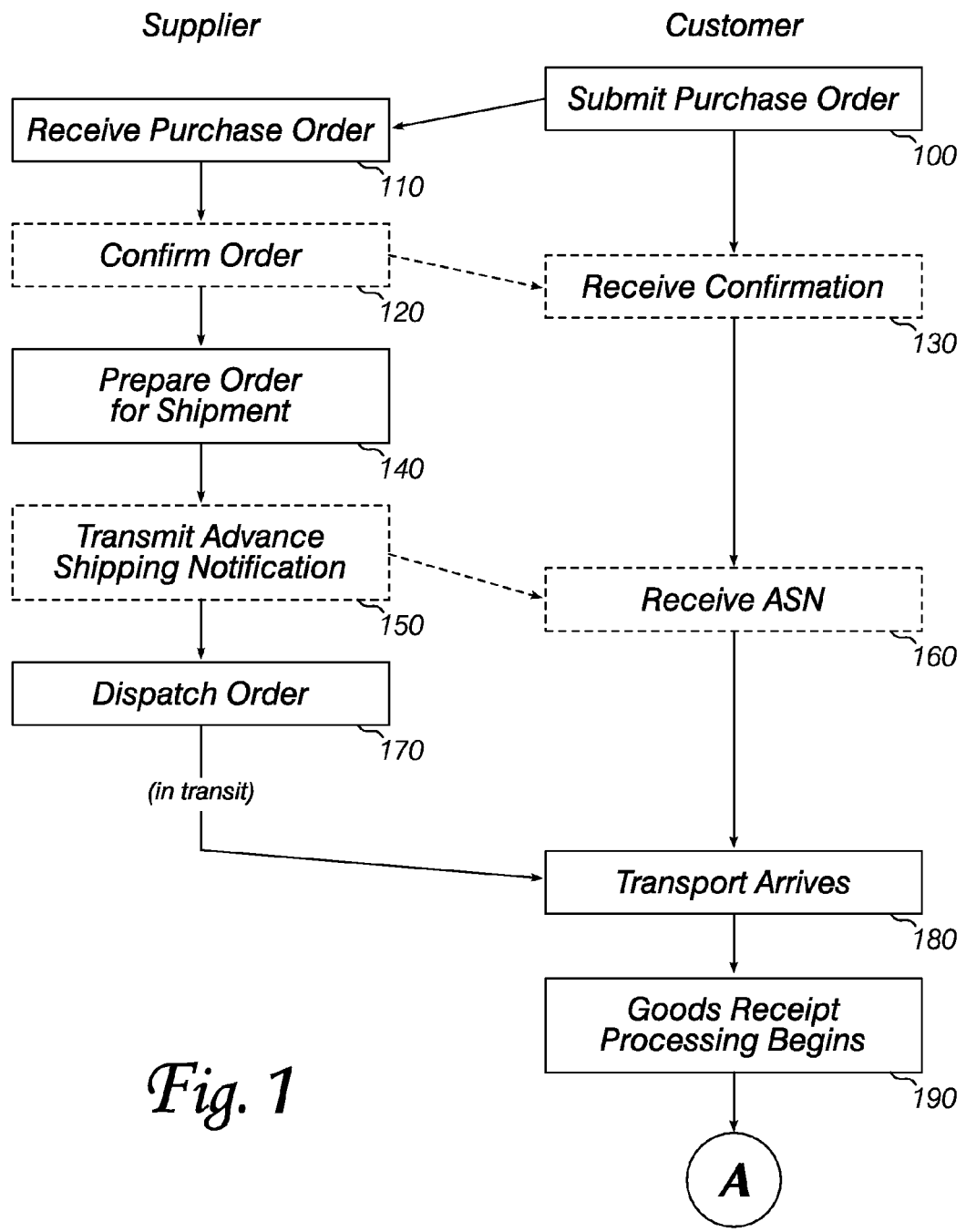
FIG. 1 is a flow chart outlining a goods-ordering process.

FIG. 1 outlines interactions between a supplier and customer that result in a shipment of goods being delivered. The customer submits a purchase order (100), which is received by the supplier (110). The supplier may confirm the order (120), resulting in a confirmation being received by the customer (130). Between merchants, however, such order confirmations are often omitted.

The supplier prepares the order for shipment (140), by manufacturing or acquiring the items ordered and packaging them for shipment. Some suppliers may operate as an information clearinghouse, merely processing orders and directing others to obtain and ship the items to the customer.

Near the time the order is ready for shipment, the supplier may send an Advanced Shipping Notification ("ASN") to the customer (150). An ASN contains information such as the identities and quantities of items to be shipped, the expected delivery date and time, and so on. If the customer receives an ASN (160), it can perform several data processing functions described below. ASN use varies by industry. Some businesses routinely use them, while others rarely do. Consequently, a goods-receiving process that is to be generally applicable should accommodate shipments either with or without a corresponding ASN.

Finally, the supplier (or another entity acting at the supplier's behest) dispatches the order (170). The goods are carried to a location specified by the customer in its order. When the transport (e.g. a truck, train, airplane or ship) arrives (180), goods receipt processing can begin (190).

Figure 2:
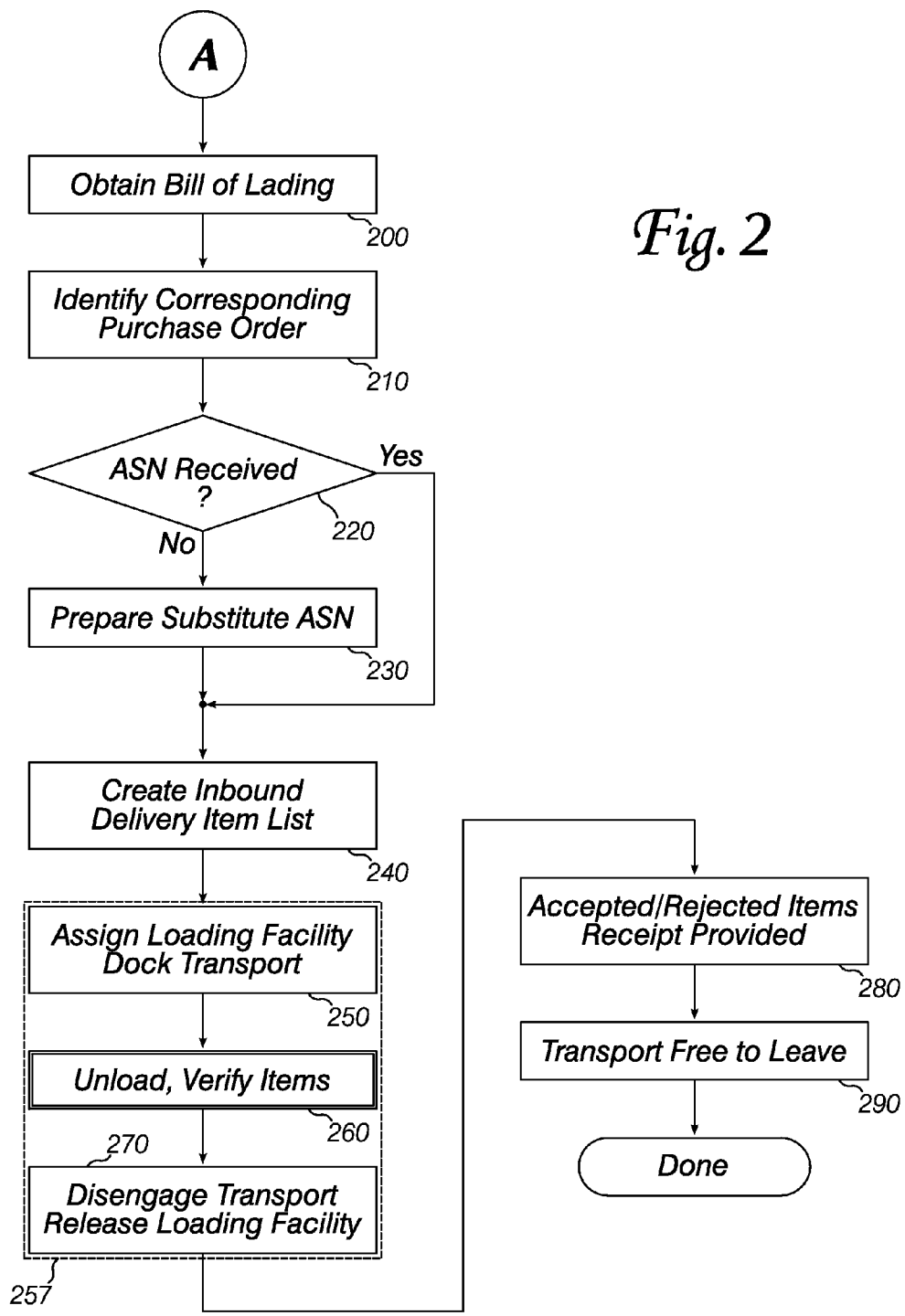
FIG. 2 shows operations performed during goods receiving according to an embodiment of the invention.

Turning to FIG. 2, goods receipt processing uses a bill of lading ("BOL") obtained from the transport (200). The BOL is typically prepared and attached to the shipment when the shipment is prepared; it lists items that should be found in the shipment and other information of use during transport and receiving. The purchase order corresponding to the shipment is identified (210). If no Advanced Shipping Notification ("ASN") was received for the shipment (220), a substitute ASN-like document may be prepared (230) by copying purchase order items into an ASN format. Next, using the ASN or a locally-prepared substitute, an inbound delivery item list is created (240) by correlating the bill of lading with the ASN. The inbound delivery item list might also be created directly from information in a database, by entering items manually, or by copying and editing an existing inbound delivery item list. After creation, the list can also be edited, for example, to adjust item quantities. The inbound delivery item list contains items that are expected to be encountered as the transport is unloaded (i.e. items in the intersection of the sets of purchase order items and bill of lading items). Systems may provide sorting and aggregating features to manipulate the list so that unloading can proceed more efficiently. For example, the inbound delivery item list may be sorted so that its elements are in the same order as the bill of lading, or aggregated so that delivery item list lines correspond to shipping units. (In other words, if an item is typically packaged in pallets of 50 units, then an order for 400 units might be represented as eight separate delivery item list lines, so that each of the eight pallets could be checked and confirmed individually.)

After the foregoing data preparation operations are complete, a loading facility is assigned and the transport is positioned for unloading (250). The loading facility assignment may include reservations of appropriate workers and equipment (generally, "resources") to perform the unloading. Thus, for example, in addition to a loading dock for a truck or a slip for a ship, the loading facility may include fork lifts or gantry cranes and workers to operate them.

The unloading and verification operation (260) is described in greater detail with reference to FIG. 3. When this operation is completed, the transport can be moved from the loading facility and the resources released (270). Subsequently, a receipt showing accepted and rejected items may be provided to the transport operator (280), whereupon the transport is free to leave (290). Note that the order of operations shown in FIG. 2 minimizes the use of loading facility resources—to the extent possible, preparations and post-delivery processing are done before or after (rather than during) the operations indicated at 257. In many environments, loading facilities are a limiting factor: there are not enough loading docks, cargo doors, pallet movers, operators and so on to service all the transports that might be present at one time. Streamlining the unloading process improves the efficiency of the overall goods receiving process by ensuring good utilization of a scarce resource.

Figure 3:
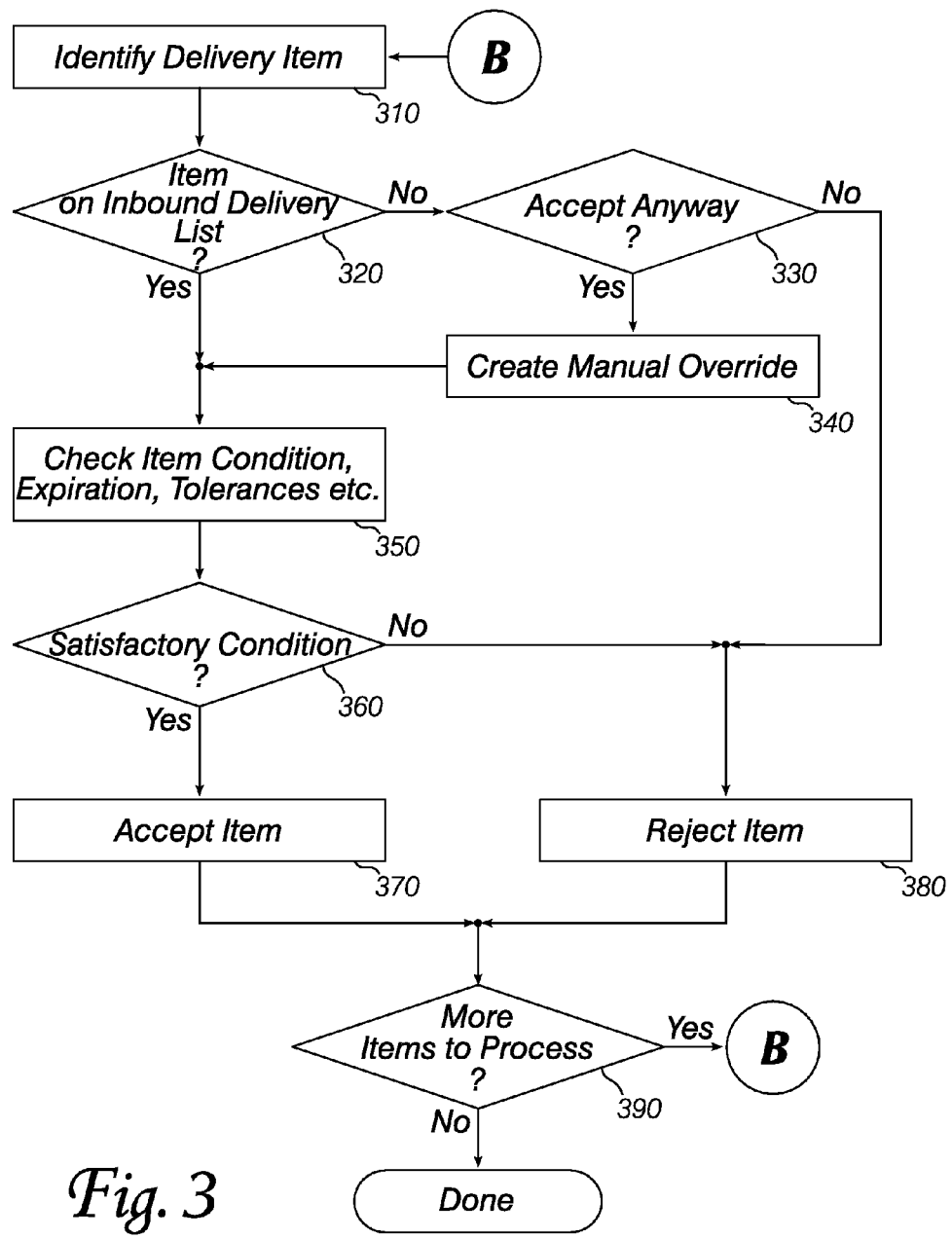
FIG. 3 details a goods unloading process that occurs during receiving.

FIG. 3 shows a set of operations for processing a plurality of items in a received shipment. Shipments often contain pallets loaded with multiple items, but pallets most frequently contain only one type of item (i.e., only a small percentage are mixed pallets). First, an item (or pallet of items) is identified (310). Identification frequently relies on a visible marker, but the marker may be scanned automatically by a bar-code scanner or similar system. Some systems employ radio-frequency identification ("RFID") tags. Next, the inbound delivery list prepared earlier is consulted to determine whether the item is expected to be part of this delivery (320). If the item is not expected, the customer may accept it anyway (330) and manually create a database entry (340). If the item is neither expected nor desired, it may be rejected (380). After identifying the item, it may receive a cursory inspection to ensure that it is not obviously damaged, outdated or otherwise non-conforming (350). If it is in satisfactory condition (360), it will be accepted (370); otherwise, it will be rejected (380). If there are more items to process (390), the next item is identified. This process repeats until all the items in the transport have been handled. By-products of the process may include lists of unexpected items (either accepted or rejected), and another list of expected but rejected items. The by-product lists may be entered into the database to update "expected" and "actual" numbers and other information.

The previously-described flow charts outline a complete, efficient process for obtaining inventory or supplies for a stage in a supply network, with particular emphasis on streamlining the goods-receiving phase to permit greater throughput when unloading facilities are a limiting factor. FIG. 4 shows a sample receiving facility of a warehouse that handles shipments of goods arriving via truck.

Arriving trucks 400 provide their shipping documents (e.g. bills of lading) at a receiving office 410 and proceed 420 to a staging area 430 to await further instructions. A data processing system 440 correlates information on the bill of lading with purchase orders and advanced shipping notifications (if any), producing an inbound delivery item list, as described above. Subsequently, when a loading facility (loading dock 450 and equipment 460 and operator 470) are available, the truck is directed 480 to the loading facility. After the truck's contents are processed as discussed in connection with FIG. 3, it departs 490, obtaining any necessary paperwork as it leaves.

It is appreciated that a number of circumstances may complicate the goods receiving process. Items from a single purchase order may arrive as several partial shipments (in different transports), or items from several purchase orders may arrive in a single shipment. Items that are different from those ordered may be shipped in error or as an accommodation, and items that were not ordered at all may be included in a shipment (either in error or as a courtesy to the customer, allowing frequently-ordered items to be obtained without incurring separate shipping charges). An embodiment of the invention may include some or all of the functionality described below to facilitate the handling of received shipments that may not contain exactly the items expected. A common design goal of these functions is to assist an organization's workers in keeping informational databases in sync with the physical reality of a warehouse or similar facility. More detailed, more accurate, and more timely information can help managers plan and allocate resources better, which in turn can help operations run more efficiently. Many of the functions can be implemented by hardware and/or software modules in an electronic data processing system that manages inventory, schedule, and other similar information for conducting a business.

Display Inbound Deliveries

This function may allow an operator to view expected deliveries over a configurable time period (e.g. the next hour, day, week or month). Items may be sorted by date/time, purchase order, transportation modality (e.g. truck, rail, ship, air), Stock Keeping Unit ("SKU"), or other characteristics. Information about completed deliveries may also be obtained. For example, an operator may be able to produce a list of items unloaded from a transport, and sub-lists showing which of those items were expected (and their corresponding purchase orders); and which were unexpected. Also, items that were expected to be delivered but were not unloaded can be identified.

Physical Characteristics Accounting

Current inventory and expected deliveries can be displayed, and physical characteristics such as weight and volume can be examined. This function may also provide information about special handling requirements, perishable goods' expiration, and so on. In connection with an inbound delivery list (discussed in reference to FIG. 2), this function may be used to estimate the resources and time required to unload goods from a transport. The time and resource estimate can, in turn, be used to schedule a reservation of a loading facility so that the facility is neither over- nor under-subscribed.

Records Relationship Navigator and Editor

Many of the elements involved in shipping and receiving have a corresponding record in a database. Records can have various sorts of interrelationships. For example, a purchase order record may include a number of line item records, each indicating a SKU and a quantity. There may be additional records for each of the items, and records for the transport on which the items are to arrive. Item records can be aggregated into other groupings as well: into shipping units (e.g. pallets) of identical items, items from the same source, items arriving on the same transport, items arriving on the same day, and so on. The navigator permits an operator to query the database to find answers to questions like "what is the daily expected inventory-on-hand of Widget X for the next week?" or "how many trucks are scheduled to arrive on Wednesday between 3:00 and 5:00, and how many pallets must be unloaded from them?"

Relationship editing functions permit an operator to adjust relationships modeled in the database to reflect reality more accurately. For example, a number of items that were expected to arrive in one transporter may be split into two or more sub-groups, some of which may be delayed. If the database is modified accordingly, then the system can plan for a shorter loading facility reservation to receive each of the sub-groups. Conversely, a transporter carrying a number of separate shipments can be identified as such, and inbound delivery documents created for all the shipments before unloading the transporter begins. The loading facility may be occupied for longer than expected for any individual shipment, but by preparing for all the deliveries in advance, the total facility-time used can be reduced.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable storage medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that streamlined goods-receiving processing can also be achieved by software and hardware that distribute the functions of embodiments of this invention differently than herein described. Such variations and implementations are understood to be captured according to the following claims.

We claim:

1. A method comprising:
receiving a shipping document in connection with an arrival of a transporter at a destination;
correlating, in a computer, items listed in the shipping document with items listed in a purchase order to produce an expected delivery manifest;
directing the transporter to a processing facility after producing the expected delivery manifest;
unloading an item from the transporter; and
verifying that the item is present on the expected delivery manifest.

2. The method of claim 1, further comprising:
receiving an advanced shipping notification ("ASN") before the correlating operation;
correlating items listed in the ASN with items listed in the purchase order to produce a pre-correlated purchase order, and wherein
correlating items listed in the shipping document with items listed in the purchase order comprises comparing the pre-correlated purchase order with the shipping document.

3. The method of claim 1, further comprising:
noting the item on an unexpected delivery manifest if the item is not present on the expected delivery manifest.

4. The method of claim 1 wherein the transporter contains items corresponding to a plurality of purchase orders, the method further comprising:
correlating items listed in the shipping document with items listed in the plurality of purchase orders to produce an expected delivery manifest containing items from all of the plurality of purchase orders.

5. The method of claim 1, further comprising:
estimating a time required to unload items on the expected delivery manifest; and
reserving the processing facility for the estimated time.

6. The method of claim 1, further comprising:
identifying resources required to unload items on the expected delivery manifest; and
confirming resource availability to perform the unloading operation before the directing operation.

7. The method of claim 1, wherein correlating comprises:
creating an expected delivery manifest item for each expected shipping unit.

8. The method of claim 1, further comprising:
sorting the expected delivery manifest to agree with an order of items listed in the shipping document.

9. A goods receiving facility comprising:
a staging area to receive a shipping vehicle carrying arriving goods;
a database to record identities and quantities of ordered goods;
comparison logic to identify an intersection of a first plurality of items listed in a shipping document from the shipping vehicle and a second plurality of items listed in the database, producing an expected delivery manifest; and
an unloading facility to remove arriving goods from the shipping vehicle and correlate the arriving goods with the expected delivery manifest, wherein
the unloading facility is engaged to unload the shipping vehicle after the expected delivery manifest is produced.

10. The goods receiving facility of claim 9, further comprising:
identification means to collect identifying data from a container unloaded from the shipping vehicle; and
confirmation means to determine whether the identifying data matches an element of the expected delivery manifest.

11. The goods receiving facility of claim 10 wherein the identification means is an optical mark scanner.

12. The goods receiving facility of claim 10 wherein the identification means is a radio-frequency identification ("RFID") scanner.

13. The goods receiving facility of claim 10, further comprising:
an anomalous delivery recorder to record identifying data of an item unloaded from the shipping vehicle that fails to match any element of the expected delivery manifest.

14. A computer-readable storage medium containing data and instructions to cause a programmable processor to perform operations comprising:
preparing an expected delivery manifest by identifying an intersection between a bill of lading and a purchase order;
directing a truck to one of a plurality of docking stations after preparing the expected delivery manifest; and
storing a received goods inventory identifying items unloaded from the truck at the one of the plurality of docking stations.

15. The computer-readable storage medium of claim 14, containing additional data and instructions to cause the programmable processor to perform further operations comprising:
sorting a plurality of items in the expected delivery manifest.

16. The computer-readable storage medium of claim 14, containing additional data and instructions to cause the programmable processor to perform further operations comprising:
grouping a plurality of items in the expected delivery manifest to agree with an expected number of shipping units.

17. The computer-readable storage medium of claim 14, containing additional data and instructions to cause the programmable processor to perform further operations comprising:
    preparing a report of items present in only one of the expected delivery manifest or the received goods inventory.

18. The computer-readable storage medium of claim 14, containing additional data and instructions to cause the programmable processor to perform further operations comprising:
    determining resources required to unload items listed on the expected delivery manifest; and
    scheduling the required resources.

\* \* \* \* \*